Dec. 8, 1970  J. R. NASH  3,545,169
INDEXING ACTUATOR
Filed Nov. 4, 1968  2 Sheets-Sheet 1
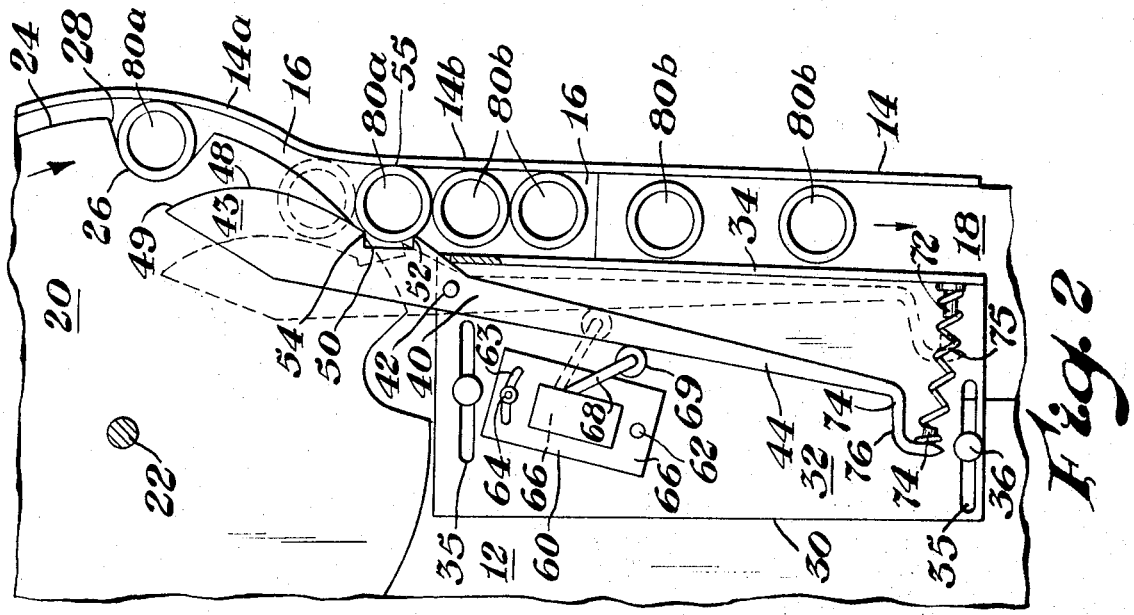
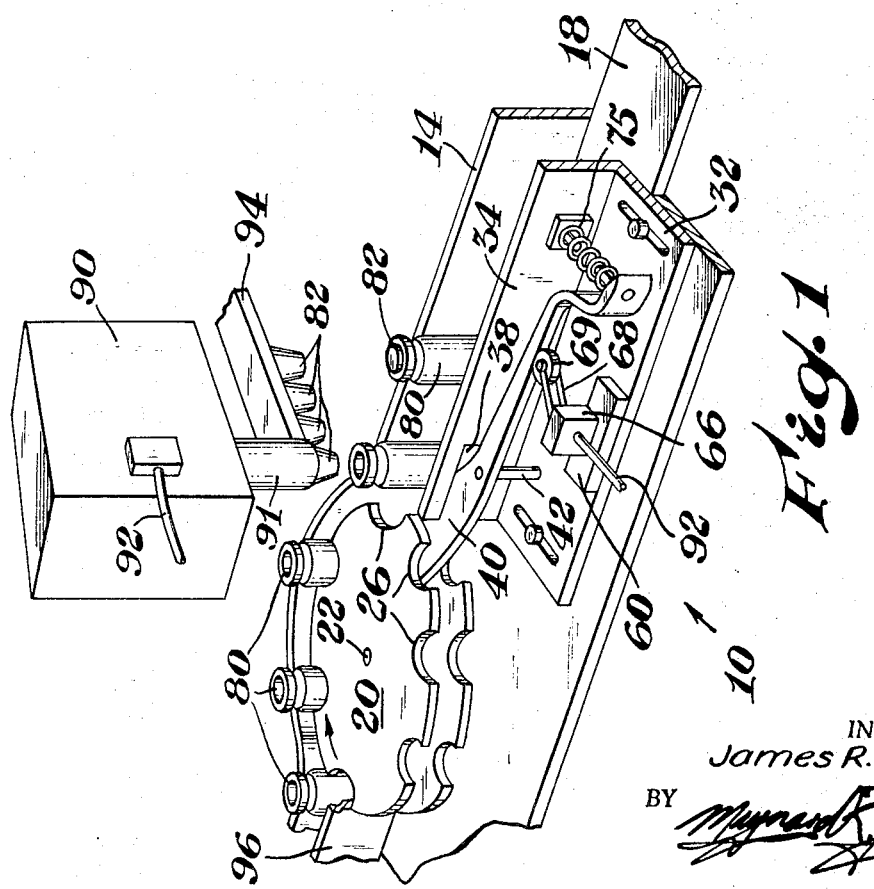
INVENTOR.
James R. Nash
BY Maynard R. Johnson
ATTORNEY

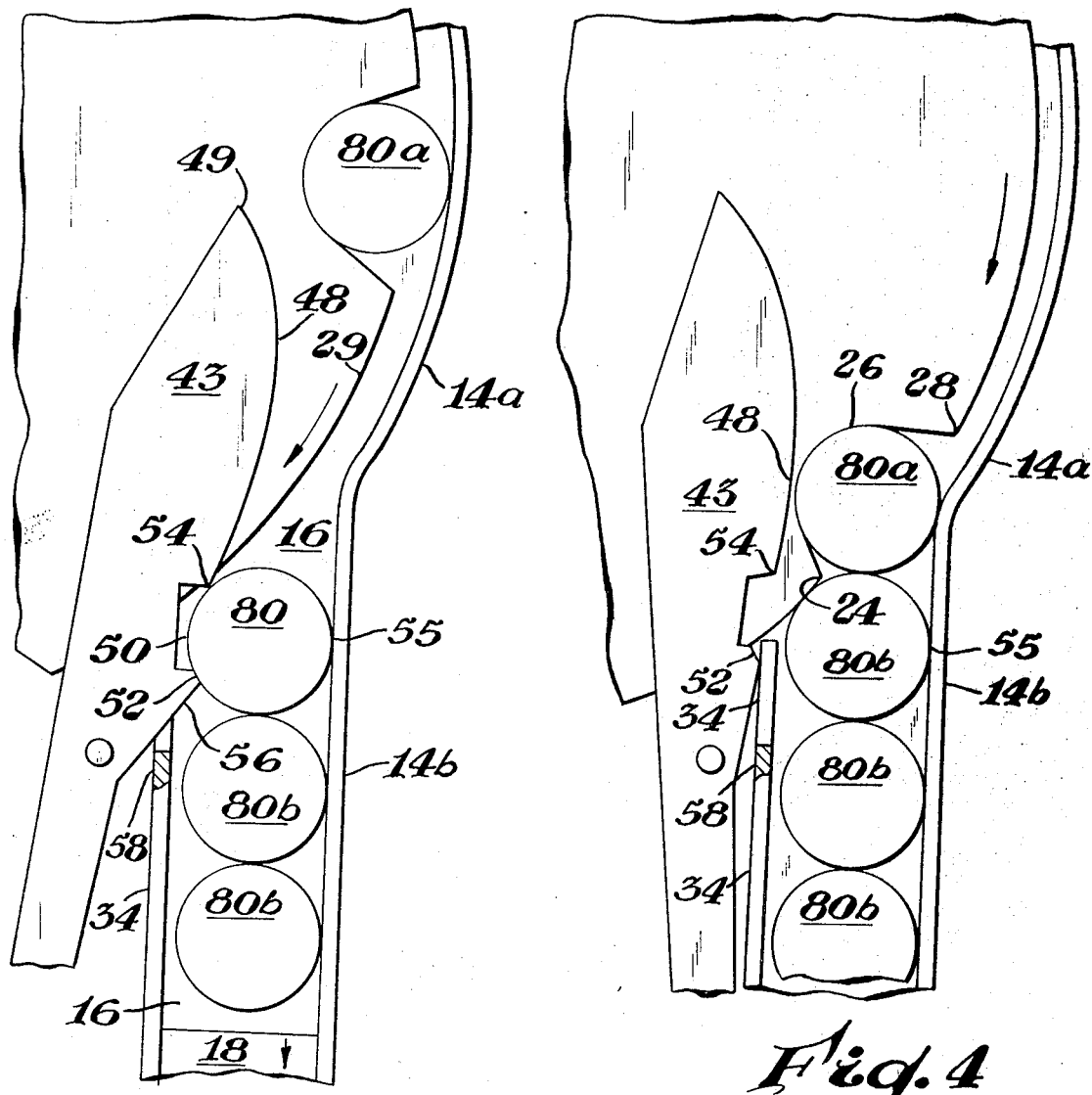

United States Patent Office 3,545,169
Patented Dec. 8, 1970

3,545,169
INDEXING ACTUATOR
James R. Nash, Zionsville, Ind., assignor to The Dow Chemical Company, Midland, Mich., a corporation of Delaware
Filed Nov. 4, 1968, Ser. No. 772,996
Int. Cl. B23q *5/22;* B65b *57/02;* B65g *47/80*
U.S. Cl. 53—67                    10 Claims

ABSTRACT OF THE DISCLOSURE

An indexing apparatus for removing articles from an indexing device such as a pocket wheel and operating a switch when the article so removed reaches a predetermined location with respect to the apparatus as described. The apparatus includes a pivotally-mounted actuator arm having a cam-like guide surface on a head portion thereof for urging individual articles out of the indexing apparatus toward the location and a notch portion thereon adjacent the predetermined location, the notch portion being adapted to fit about a portion of the periphery of an article to arrest the article when the actuator arm moves to one pivotal position and a switch sensitive to the position of the pivot arm so that actuation of an individual operating mechanism is accomplished when an article is so engaged.

BACKGROUND OF THE INVENTION

The present invention is concerned with devices useful for actuating apparatus employed to handle articles in individual discontinuous fashion such as articles supplied from an indexing device. The apparatus is particularly useful in bottle stoppering apparatus for actuating a stopper inserting device. Such apparatus typically includes a conveyor or other means for moving a continuous supply of bottles, an indexing device such as a pocket wheel or star wheel for moving the bottles in timed or spaced relation to each other to a stopper inserting mechanism and apparatus for supplying stoppers to the device. Representative stoppering apparatus is described in U.S. Pats. 1,958,248, 2,826,885, 2,841,940 and 2,823,500. Switching circuits and control circuitry for actuating stopper-inserting ram are described in U.S. Pat. 2,826,885. Representative indexing devices for feeding articles into a path at timed intervals or in spaced relation to each other are described in U.S. Pats. 2,739,695 and 2,910,167.

In apparatus for the continuous handling of successive articles such as bottles, it is frequently desirable to actuate various individual operating mechanisms of the apparatus such as filling devices, stoppering devices, labelling devices, and the like by a device which is sensitive to the arrival of an individual article at a particular station.

The term "individual operating mechanism" is employed herein to refer to apparatus which performs a discrete operation on a discrete article as the article arrives at a patricular location, herein referred to as an "operating station," and which require a predetermined juxtaposition of the article and the mechanism for a predetermined operating time. The term thus refers to bottle-filling mechanisms, bottle-stoppering mechanisms, label-applying mechanisms and the like as opposed to mechanisms such as continuous washers, continuous sterilizers and the like which can operate on bottles as they pass the mechanism, regardless of whether the individual bottles remain fixed with respect to a portion of the mechanism for a period of time or continue motion past and beyond the mechanism.

It is desirable to provide simple apparatus for positioning the individual bottles at an operating station adjacent an individual operating mechanism for a time sufficient for the operation of the mechanism to be complete, and for thereafter replacing the processed article with a succeeding article to be handled.

The rapidity and accuracy with which indiivdual articles are positioned at the operating station, the individual operating mechanism actuated, and the processed article replaced by a succeeding article can limit the rate of operation of the entire apparatus, particularly when the apparatus is to be operated at high speeds, such as from 200 to 250 or more individual articles per minute. In handling of biologicals and pharmaceuticals such as vaccines, immune sera, parenteral preparations and the like, the apparatus must be frequently disinfected with materials such as beta-propiolactone. Many disinfectants, and particularly beta-propiolactone, have a tendency to leave sticky or gummy deposits on operating surfaces. In devices to be employed in handling of such products, the apparatus employed to actuate individual operating mechanisms, such as bottle-stoppering mechanisms or bottle fillers, must be capable of sustained high speed operation independently of whether or not surfaces of the actuating mechanism are coated with sticky deposits of disinfectants such as beta-propiolactone, or spilled product materials, or the like.

SUMMARY OF THE INVENTION

The present invention is concerned with apparatus useful for the positioning of articles moving along a path at a predetermined operating station at which the articles are to be processed individually, for actuating an individual operating mechanism when an individual article is so positioned and for replacing an article processed by the mechanism with another article. The invention is particularly directed to apparatus useful for guiding individual articles from an operating station, for actuating an individual operating mechanism when the article is in said operating station, and for replacing a processed article with a succeeding article supplied by the indexing apparatus after the operation of the mechanism is complete.

It is an object of the invention to provide a position sensitive actuator apparatus for handling of indexed articles at a location. It is a further object of the invention to provide such a device in which processed articles are moved from the operating position by the next succeeding article supplied by an indexing device. It is a further object of the invention to provide a simple device of the type described which is operable at high speeds and under conditions including the presence of sticky deposits which are encountered in the production and packaging of material such as vaccines and the like.

The aparatus includes an indexing device for supplying of articles at intervals toward an operating station, a movable actuator arm for urging an individual article from the indexing device to an operating station when the guide is in one position, notch means on the guide for positioning the article in an operating station when the guide is in a second position, means operably engaged with the actuator arm for actuating an individual operating mechanism when the actuator arm is in the second position, and means on the actuator arm for releasing the article. The apparatus further includes means on the actuator for releasing a processed article from the notch when the indexing device advances the next succeeding article into engagement with the actuator arm, and for replacing the processed article with the next succeeding article. The device is simple in construction and operation and is capable of positioning and processing of individual articles for sustained periods of high speed operations under conditions typically encountered in handling of biological materials, including the use of disinfectants such as beta-propiolactone.

BRIEF DESCRIPTION OF THE DRAWING

Additional objects and advantages of the invention will be apparent on consideration of the following description and claims and of the drawings wherein:

FIG. 1 is an isometric view of an indexing actuator device of the invention in a continuous article handling line having infeed and take-off coveyors;

FIG. 2 is a plan view of the device of FIG. 1 partially in section with a second position of the actuator arm and switch arm shown in phantom lines to illustrate the operation of the device;

FIG. 3 is a schematic plan view of a portion of the device of the invention in one phase of the operation thereof; and FIG. 4 is a schematic plan view of a portion of the device of the invention in another phase of the operation thereof.

DESCRIPTION OF THE PREFERRED EMBODIMENTS

Referring more particularly to the drawings, the device 10 includes a base 12, guide rails 14, 34 on the base defining a portion of a slideway path 16, a pocket wheel index device 20 on the base for moving an article 80 along an arcuate segment of the path 16 defined by a segment of the pocket wheel 20 and an adjacent arcuate portion of rail 14 toward an operating station in a portion of path 16 adjacent the pocket wheel, the operating station being the position of an article which is disposed path 16 in tangential contact with a portion 55 of guide rail 14, an individual operating mechanism 90 operably aligned with the operating station, an actuator arm 40 movably mounted on the base and having a head portion 43 thereof extending along a portion of path 16 to the operating station, a notch portion 50 of the head of the actuator arm 40 in operative alignment with the individual operating mechanism 90 and adapted to contact an individual article on at least two contact portions 52, 54 of the notch 50 and maintain an article so contacted in the operating station when the actuator arm 40 is in a first position, the operating station being thus defined by the contact portions 52, 54 of he actuator arm 40 and an opposed portion 55 of rail 14, a biasing spring 75 operably engaged with a tail portion 44 of the actuator arm 40 for biasing actuator arm 40 toward such first position, switch means 60 operably engaged with the actuator arm 40 for activating the individual operating mechanism 90 when the actuator arm 40 is in said first position, the head 43 of the actuator arm having a cam-follower surface 48 defining a movable boundary of a portion of the arcuate segment of path 16 so that the engagement of the cam-follower portion 48 with an article 80 moved by the indexing device 20 displaces the actuator arm 40 toward a second position in which the notch portion 50 is displaced from the operating station toward an article-releasing position. The device 10 can be further characterized in that the notch 50 and individual operating mechanism 90 are so disposed that the operating station is within an article-bridgable distance of the pocket wheel 20, that is, the distance between an article 80 in the operating station and the periphery 29 of the pocket wheel 20 can be bridged by another article 80 which tangentially engages both. When the articles have a substantially circular cross-section, the operating station and the periphery of the pocket wheel are separated by a distance less than a chord of an article, and preferably by less than one article radius. The apparatus can further comprise a take-off conveyor 18 immedmiately adjacent to the operating station for displacing an article to a distance removed from the operating station when said article has been moved therefrom by a succeeding article.

In the embodiment shown in the attached drawings, the pocket wheel 20 and take-off conveyor 18 are operated so that the articles 80 move in a direction generally from left to right in FIG. 1 and from top to bottom in FIGS. 2, 3 and 4. The pocket wheel indexing device 20 is of a conventional sort comprising a pair of parallel discs with a common axis 22, having a series of article-receiving pockets 26 in the periphery thereof, and a series of arms 24 separating the pockets 26. The arcuate portion 14a of guide rail 14 extends about a portion of the periphery 29 of the pocket wheel 20 to maintain the articles 80 in engagement with the pockets 26. A straight portion 14b of rail 14 extends from the pocket wheel in a direction parallel to rail 34 and along the take-off conveyor 18 to guide the articles moving from the pocket wheel to the operating station, and beyond the same to the take-off conveyor. The articles 80, as shown in the drawings, are bottles of a generally cylindrical configuration having a substantially circular cross-section in the plane of path 16; however, it is understood that articles of other shapes can also be employed with the device of the invention. In the normal operation of the pocket wheel 20, the pocket wheel 20 rotates clockwise about axis 22, being driven by conventional drive means such as an electric motor (not shown). Preferably, variable speed drive means are employed so that the rate of rotation of the pocket wheel can be adjusted to obtain a predetermined angular velocity corresponding to the rate of operation of the individual opreating mechanism. Articles 80 are fed into the pockets 26 by an infeed conveyor upstream of the device 10 at the location indicated by the reference character 96 in FIG. 1. The articles 80 are moved along an arcuate portion of the path by contact with a trailing edge 28 of a pocket 26, and are maintained in the pocket by contact with the arcuate portion 14a of the guide rail 14. The article 80 so moved are typically supported on a slideway portion of path 16 while they are engaged with the pockets of the pocket wheel 20 and after they leave the pocket wheel and arrive at the operating station.

The individual operating mechanism 90 disposed over the operating station is illustrated in FIG. 1 as a bottle stoppering device. Stoppering device 90 includes a vertically reciprocable ram device 91 for inserting stoppers 82 into a bottle 80 which is in the operating station and a stopper feed chute 94 for supplying stoppers to the ram. In the normal position of the stoppering apparatus 90, the ram is elevated as shown in FIG. 1. An electrical connection 92 operably connects the ram apparatus with the switch mechanism 60 so that closing of the switch activates the ram 91 for the insertion of a single stopper followed by withdrawal of the ram to the normal elevated position. The individual operating mechanism 90 is preferably adjustably mounted on adjustable supports (not shown) so that the position thereof can be altered to handle articles of different sizes. The details of construction of the stopper inserting apparatus, the ram stopper feed chute 94, and the switch and control circuitry involved are known and are not a part of the present invention. While the individual operating mechanism illustrated in the drawings is a stopper inserting device, it is understood that other types of individual operating mechanisms can be employed with the device of the invention such as, for example, bottle fillers, bottle cappers, a device for applying labels, or the like.

The actuator arm 40 is pivotally mounted on a pivot pin 42. Pivot pin 42 is preferably adjustably mounted on base 12 by means of an actuator subassembly 30 including a base plate 32 and rail 34. Base plate 32 includes slots 35 adapated to fit over mounting bolts 36 to permit mounting of the actuator subassembly on base 12 at varying predetermined distances from rail 14 to accommodate articles of different sizes. Alternately, base plate 32 can be removed from the device and replaced with a different base plate, actuator arm and switch when articles of different size are to be handled.

The head portion 43 of the actuator arm 40 extends from the pivot pin 42 toward the indexing pocket wheel 20, and part of head portion 43 extends within the circumference of the pocket wheel. Actuator arm head 43 includes a convex curved cam-follower surface 48, which, in conjunction with the arcuate portion of guide rail 14, defines a portion of path 16. As the actuator arm 40 pivots about pivot pin 42 between a first position illustrated by the solid lines in FIG. 2 and a second position indicated by broken lines, guide rail 14 and the movable cam follower surface 48 define a portion of path 16 of variable width. Such variable-width portion of the path is at least sufficiently wide to permit an article 80 to pass along surface 48 to the operating station when the actuator arm head 43 is displcaed toward the second position by the camming action of an article 80 on cam-follower surface 48, and sufficiently narrow when the actuator arm 40 is in the first position so that an article 80 traversing that portion of the path will engage the cam-follower surface 48 and displace the actuator arm toward the second position. The arcuate length thereof is less than the circumferential distance between the pockets 26, so that only one article at a time can traverse the path portion.

Since the cam-follower surface 48 is convex, the variable width portion of path 16 between surface 48 and rail 14 is constricted along a portion intermediate receiving surface 49 and notch 50, the cam follower surface 48 extending away from rail 14 in the region between the constriction and notch 50.

The articles 80 carried in the pockets 26 of pocket wheel 20 thus serve as cam surfaces carried by the pocket wheel and spaced circumferentially thereon at locations corresponding to the pockets 26. The pockets 26, and therefore the cam surfaces, are so spaced that actuator arm 40 remains in the first position for a time sufficient for the individual operating mechanism 90 to perform a complete operation on a bottle 80 before rotation of the pocket wheel 20 at a predetermined speed brings another bottle 80 into camming engagement with the actuator arm 40. Separate cam surfaces can be employed in addition to the articles 80, however, excellent performance can be obtained when the articles 80 themselves are employed to provide the desired camming action and the use of the articles 80 as cam surfaces minimizes the effect of variations in the pockets or arms of the pocket wheel.

When actuator arm 40 is in the first position indicated by the solid lines in FIG. 2 and also shown in FIG. 3, the notch portion 50 thereof is situated slightly beyond the circumference of the pocketwheel 20. The notch 50 includes contacts adapted to engage an article 80 along a non-radial chord thereof. The contacts include a forward contact 52 and a rear contact 54 with respect to the direction of travel of articles along path 16. When the actuator arm 40 is in the first position, an article 80 contacted by forward and rear contact 52, 54 is urged against an opposed portion 55 of the stationary rail 14 and thus held in the operating station by simultaneous engagement with the contacts 52, 54 and the opposed portion 55 of the guide rail 14. Preferably the notch 50 between contacts 52, 54 is sufficient to receive the arcuate portion of the article 80 between the contacts without engaging an additional portion thereof, so that an article 80 in the operating position is engaged at three separate portions thereof by contacts 52, 54 and opposed portion 55 of rail 14. The portions of a cylindrical article so engaged are preferably disposed along non-radial chords of the article. Such non-radially-engaging relation of the contacts and opposed rail greatly enhances accurate positioning of an article in the operating station and minimizes the effects of slight deviations in circularity and diameter between articles.

As continued clockwise rotation of the pocket wheel 20 moves the next succeeding article 80a along path 16 toward the head 43 of actuator arm 40, the article is received between the receiving portion 49 of the actuator arm head and the rail 14. Continued movement of the pocket results in camming action of the succeeding article 80a on the cam surface 48 of the actuator arm 40. When the succeeding article or bottle 80a has reached a location along path 16 at which it contacts the processed article or stoppered bottle 80b in the operating station, as best shown in FIG. 4, actuator arm 40 is displaced from rail 14 so that the contact surfaces 52 and 54 are disengaged from the article and displaced from rail 14 sufficiently to permit the article 80b to move from the operating station toward the take-off conveyor 18. Continued motion of the succeeding article 80a pushes the processed article 80b from the operating station toward conveyor 18.

The operating station is spaced slightly from the pocket wheel 20 and is also spaced from the conveyor 18 to minimize contact of an article in the operating station with moving parts. The path distance from the conveyor 18 to the circumference or periphery 29 of pocket wheel 20 is thus at least one article-diameter, and preferably between one and ten article-diameters from the circumference of pocket wheel 20. The handled articles are moved from the operating station to the conveyor 18 by the succeeding articles each time an article is moved from the pocket wheel to the operating station. Thus the number of articles between the operating station and the conveyor should not be so great as to deleteriously affect the operation of the pocket wheel.

The take-off conveyor 18 is preferably disposed no further from the operating station than the diameter of the largest bottle 80 to be handled so that displacement of a stoppered bottle 80b from the operating station by the succeeding bottle 80a forces the stoppered bottle 80b into carrying engagement with take-off conveyor 18.

The displacement of the actuator arm 40 is preferably restricted so that the portions thereof in contact with article 80 are not substantially further from rail 14 than is the parallel rail 34. When the actuator arm is in the second position, the cam surface serves as an extension of guide rail 34 to urge the article 80a out of the pocket 26 and more or less tangentially away from pocket wheel 20.

In the preferred embodiment, rail 34 extends along a portion of path 16 adjacent the operating station opposite portion 55 of guide rail 14. A portion of rail 34 is cut away to form a slot 38 through which the notch portion 50 and contact surfaces 52 and 54 of the actuator arm 40 are free to move. The head portion 43 of actuator arm 40 can also include a cutaway surface 56 extending from forward contact surface 52 toward pivot pin 42. The edge 58 of slot 38 then serves as a stop to limit the motion of the actuator arm head portion 43 toward rail 14 when the operating station is vacant. The stop limits the pivotal motion of the actuator arm head 43 toward rail 14 at a position in which the receiving portion 49 of the cam-follower surface 48 is more distant from rail 14 than the diameter of an article 80 so that the actuator arm remains in an article-receiving position.

The switch 60 is adjustably mounted on the actuator base plate 32 by means of a switch plate 61 pivotally mounted on pin 62. Switchplate 61 includes an arcuate adjusting slot 63 which is mounted about a bolt 64 extending upwardly from base plate 32. Switchplate 61 can be pivotally moved on base plate 32 and secured in a predetermined position by tightening bolt 64. The switch includes a conventional microswitch 66 mounted on the switch plate 61 and operably engaged with the tail 44 of actuator arm 40 by means of a follower wheel 69 and arms 68. Arms 68 and wheel 69 are normally biased toward the position shown by the broken lines in FIG. 2 to maintain wheel 69 in contact with the tail portion of actuator arm 40 when the actuator arm is in the second position. The microswitch 66 is of a conventional sort and is adapted to operate so that it is closed when arms 68 and wheel 69 are moved to the position shown by the solid lines in FIG. 2 by the movement of the actuator arm 40 to the first or article-engaging position. The switch remains open when arms 68 and wheel 69 are in the position shown by lines in FIG. 2, that is, when the actuator arm head 43 is displaced from rail 14 toward the second position.

Tail portion 44 of actuator arm 40 includes an L-shaped section 76 which is engaged with a biasing spring 75 extending between the L-shaped section 76 and a portion of rail 34 bias the actuator arm 40 toward the article-engaging first position shown in FIG. 3 and shown by the solid lines in FIG. 2. Spring 75 is preferably mounted on a pair of posts 72, 74 extending from rail 34 and L-shaped portion 76, respectively. Posts 72, 74 serve to guide and support spring 75 and to guide the same as actuator arm 40 pivots on pivot pin 42. Posts 72, 74 can also be adapted to contact each other when actuator arm attains the second position, thus restricting the motion of actuator arm 40 at a position in which curved portion 48 is at a maximum distance from rail 14.

In the operation of the device of the invention, uncapped bottles are fed continuously into the pocket wheel 20. Rotation of the pocket wheel moves the bottles in spaced relation to each other toward the cam-follower surface 48 and receiving portion 49 of the actuator arm 40. As an unstoppered bottle 89a reaches position of path 16 in which it contacts both the stationary rail 14 and the cam surface 48 of the actuator arm 40, further motion of the bottle 80a forces the head 43 of the actuator arm 40 away from rail 14 and disengaging contact surfaces 52, 54 from the bottle 80b in the stoppering station. As the unstoppered bottle 80a reaches the position shown in FIG. 4, it is in simultaneous contact with a portion of the pocket wheel 20, with cam-followed surface 48, with rail 14 and with a stoppered bottle 80b which is in the operating station position. At this time bottle 80a is moving tangentially to the pocket wheel 20 and at an obtuse angle to the straight portion of path 16 along the straight portion 14b of rail 14. As the pocket wheel continuesc to rotate, the actuator arm head guides the bottle 80a away from pocket 26 along the cam-follower surface toward the notch portion 50 and the operating station. As the unstoppered bottle 80a moves out of pocket 26, it pushes the preceding stoppered bottle 80b from the operating position toward take-off conveyor 18. When unstoppered bottle 80a has reached a position in which it can no longer be moved by contact with the pocket wheel 20, that is, a position in which it is tangential to the circumference of the pocket wheel or displaced slightly therefrom toward the operating station, it is substantially in the position indicated by the bottle 80 in FIG. 3 and between notch 50 and opposed portion 55 of the guide rail 14. As the bottle 80 moves into such position, the actuator arm head moves toward rail 14 under the influence of spring 75 and the contact surfaces 52 and 54 contact the periphery of the bottle and hold the same against the opposed portion 55 of guide rail 14, arresting further motion of the bottle and holding it in the operating station under the stoppering mechanism 90. As the rigid actuator arm 40 rotates on pivot pin 42 into the position in which the bottle is engaged by the contact surfaces 52, 54 and opposed portions 55 of the guide rail, the resulting pivotal motion of the tail portion 44 of actuator arm 40 against the switch follower wheel 69 closes the microswitch 66 and activates the stopper inserting mechanism 90.

Since the biasing force of spring 75 is employed to close the microswitch rather than the momentum of the bottle, the effects of minor variations in bottle size and frictional resistance to bottle motion are minimized. Since a stoppered bottle 80b is pushed from the operating station by the motion of the pocket wheel and of the succeeding article 80a as article 80a leaves a pocket, a steady force is exerted by bottle 80a or bottle 80b, and sharp impacts or collisions between the bottles are also minimized. Continued rotation of the pocket wheel advances yet another unstoppered bottle into camming engagement with the actuator arm head 43 and the process is then repeated.

Under normal operating conditions, and particularly when the apparatus is operated at high speeds such as about 250 bottles per minute, a bottle has sufficient momentum as it leaves the pocket wheel along curved cam surface 48 to continue beyond the periphery of the pocket wheel and push the preceding bottle from the operating station into carrying engagement with the conveyor 18. The rearward contact surface 54 of the notch portion 50 of the actuator arm is in a region of the convex cam-follower surface 48 in which the surface 48 curves away from rail 14. Due to the convexity of the cam-follower surface, the center of a bottle emerging from a pocket is nearer the operating station than the portion of the bottle engaging the cam-follower surface. Since the head portion 43 of actuator arm 40 is biased toward guide rail 14, the biasing force acts on a rearward portion of the bottle and urges a bottle away from pocket wheel 20 toward the operating station and notch 50.

While representative embodiments have been shown and described for the purpose of illustrating the invention, it is apparent that modifications can be made therein which are well within the skill of those skilled in the art. For example, a bottle filler can be employed at the operating location in lieu of a bottle stoppering apparatus; means other than a microswitch, such as photo-electric means for sensing the position of the actuator arm can be employed to activate the individual operating mechanism; the actuator arm can be slidably mounted on the base between guides, rather than pivotally mounted on the base, or the pocket wheel can have cam surfaces releasably engageable with a portion of the actuator arm head, the device in such case being provided with a separate article engaging guide surface for guiding articles from the pocket wheel toward the operating station.

What is claimed is:
1. An apparatus comprising:
   a base;
   index means on the base for moving articles along a path from a first location toward an operating station in spaced relation to the index means;
   an individual operating mechanism in operational alignment with the operating station;
   an actuator arm mounted on the base and movable thereon between a first position and another position, the actuator arm including a recessed portion adapted to receive a portion of an article and at least two contact surfaces adapted to contact a first article disposed at the operating station in article-arresting engagement with two portions thereof when the actuator arm is in the first position;
   means for biasing the actuator arm toward the first position;
   actuator displacement means responsive to movement of the index means, including a cam surface carried by the index means and a cam-follower operatively engaged with the actuator arm for displacing the actuator arm from the first position thereof toward another position in which the contact surfaces are in article-releasing relation to a first article disposed at the operating station;
   guide means slidably engageable with an article moved by the index means for disengaging the article therefrom and guiding the article toward the operating location;
   switch means responsive to the movement of the actuator arm for activating the individual operating mechanism when the actuator arm is in the first position thereof; and
   article displacement means responsive to the movement of a second article by the index means for displacing the first article from the operating station when the actuator arm is in article-releasing relation thereto.
2. The apparatus of claim 1 wherein the cam surface carried by the index means is a second article and the cam-follower comprises a portion of the actuator arm.

3. The apparatus of claim 1 wherein the guide means comprises a guide rail tangentially adjacent the operating station in opposing relation to the contact surfaces of the actuator arm and a convex portion of the actuator arm adjacent the recessed portion thereof.

4. The apparatus of claim 1 wherein the displacement means includes a conveyor adjacent the operating station, and a second article moved by the index means, the index means being in an article-bridgeable relation to the operating station adapted to provide for pushing engagement of a second article moved by the index means with a first article situated at the operating station, and the actuator displacement means being responsive to the movement of the second article to displace the contact surfaces of the actuator arm into article-releasing relation with the first article when the first and second articles are so engaged.

5. The apparatus of claim 4 wherein the cam surface carried by the index means is the second article, and the cam follower includes a follower portion of the actuator arm extending from the recessed portion toward the index means, said follower portion having a convex curvature such that the actuator arm is displaced from the first position thereof when an article is disposed in simultaneous tangential relation to the index means, the convex follower portion of the actuator arm and the operating station.

6. The apparatus of claim 4 wherein the articles have a substantially circular cross-section in the plane of the path and the conveyor is disposed in spaced relation to the index means at a distance of greater than one article-diameter therefrom.

7. The apparatus of claim 4 wherein the articles have a substantially circular cross-section in the place of the path and the index means is within one article radius of the operating station.

8. The apparatus of claim 1 wherein the actuator arm contact surfaces are adapted to contact an article which has a substantially circular cross-section in the plane of the path at two portions along a non-radial chord thereof and the guide means includes a guide rail tangentially adjacent the operating station and adapted to contact an article engaged with the contact surfaces at a third portion thereof along a non-radial chord thereof with respect to the first two portions.

9. The apparatus of claim 8 wherein the cam surface carried by the index means is a second article, the cam follower is a portion of the actuator arm, and the guide means includes a portion of the actuator arm.

10. The apparatus of claim 1 wherein the articles are bottles and the individual operating mechanism is a bottle-stoppering mechanism.

References Cited

UNITED STATES PATENTS 698,701  4/1902  Guenther _____ 198—34X

EDWARD A. SROKA, Primary Examiner

U.S. Cl. X.R.

198—19, 25